US008324839B2

(12) United States Patent
Ku et al.

(10) Patent No.: US 8,324,839 B2
(45) Date of Patent: Dec. 4, 2012

(54) LAMP CONTROL SYSTEM

(75) Inventors: Chin-Long Ku, Taipei Hsien (TW); Yang Sun, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 274 days.

(21) Appl. No.: 12/695,162

(22) Filed: Jan. 28, 2010

(65) Prior Publication Data

US 2011/0140609 A1    Jun. 16, 2011

(30) Foreign Application Priority Data

Dec. 11, 2009 (CN) .......................... 2009 1 0311289

(51) Int. Cl.
*G05F 1/00* (2006.01)
*H05B 37/02* (2006.01)

(52) U.S. Cl. ....................................... 315/307; 315/291

(58) Field of Classification Search .................. 315/291, 315/307, 308, 224, 300, 160, 200 R, 185 R, 315/185 S, 246, 247
See application file for complete search history.

(56) References Cited

U.S. PATENT DOCUMENTS

| | | | | |
|---|---|---|---|---|
| 5,982,645 | A * | 11/1999 | Levran et al. | 363/37 |
| 6,552,501 | B2 * | 4/2003 | Ito et al. | 315/308 |
| 7,348,737 | B2 * | 3/2008 | Fujii et al. | 315/307 |
| 7,391,335 | B2 * | 6/2008 | Mubaslat et al. | 340/657 |
| 7,528,554 | B2 * | 5/2009 | Chitta et al. | 315/291 |
| 7,586,762 | B2 * | 9/2009 | Hsu | 363/21.12 |
| 7,589,704 | B2 * | 9/2009 | Goder et al. | 345/89 |
| 8,053,923 | B2 * | 11/2011 | Tateishi et al. | 307/10.8 |
| 2009/0027160 | A1 * | 1/2009 | Ikushima et al. | 340/5.61 |

OTHER PUBLICATIONS

Supertex Inc HV9912.*
Supertex Inc., Switch-mode LED Driver IC with High Current Accuracy and Hiccup Mode Protection,2009,12,US.

* cited by examiner

*Primary Examiner* — Minh D A
(74) *Attorney, Agent, or Firm* — Altis Law Group, Inc.

(57) ABSTRACT

A lamp control system includes a first driving circuit, an assistance DC power source having an output voltage lower than a working voltage of a lamp and a second driving circuit. The first driving circuit electrically connects the lamp with a utility power source to convert an AC power a DC power and supply the DC power to the lamp. The second driving circuit electrically connects the assistance DC power source with the lamp. The second driving circuit includes a boost circuit, which is connected to the assistance DC power source to promote the output voltage of the assistance DC power source to the working voltage of the lamp and then supply electrical power with the promoted voltage to the lamp when the utility power source is off.

9 Claims, 2 Drawing Sheets

LAMP CONTROL SYSTEM

BACKGROUND

1. Technical Field

The present disclosure relates to lamp control systems, and more particularly to a lamp control system which is capable of providing both normal and emergency illuminations.

2. Description of Related Art

Recently, light emitting diodes (LEDs) have become widely used lamps, for example, miner's lamps, street lamps, submarine lamps, stage lamps and tunnel lamps, for their low power requirement and long lifetime. Generally, the LED lamps are connected to a utility power for obtaining electric power therefrom.

However, when used, interruption of the utility power for the LED lamps is unavoidable for some unexpected reasons, which can not always satisfy needs of users. Take the tunnel lamps for example, when the utility power is interrupted, an interior of the tunnel is totally dark. At this time, if a car runs through the tunnel and suddenly breaks down for some trouble, a traffic jam may be generated since the interior of the tunnel is totally dark and the driver can not repair the car.

It is thus desirable to provide a lamp control system which can overcome the described limitations.

DETAILED DESCRIPTION

Figure 1:
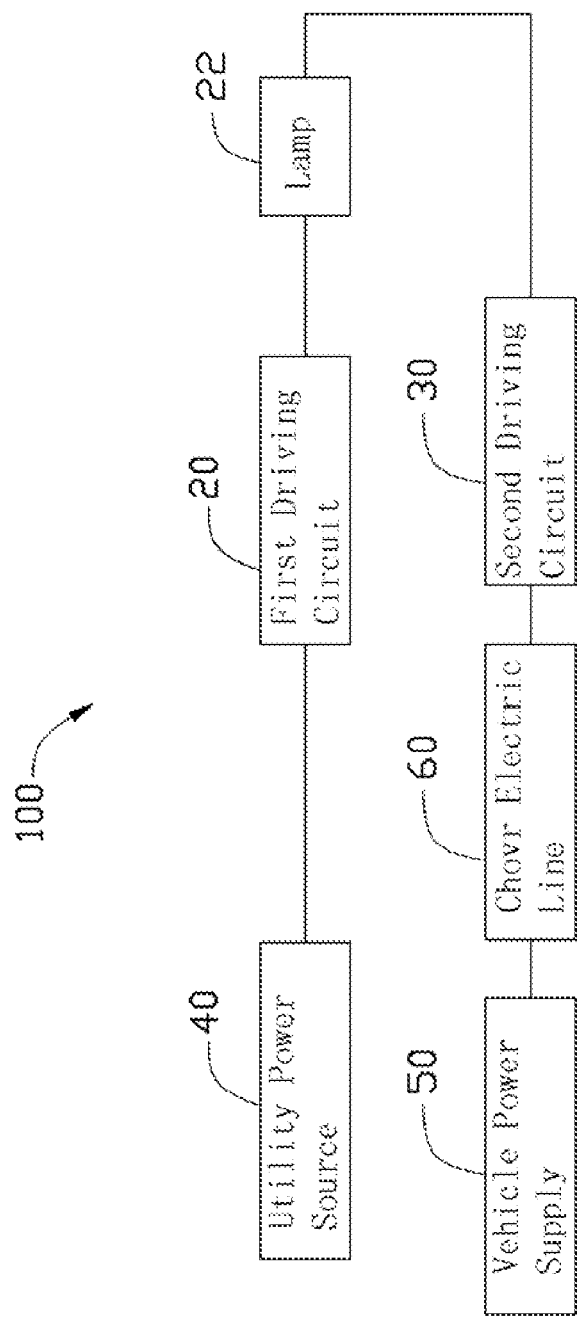
FIG. 1 is a block diagram illustrating a lamp control system according to an exemplary embodiment of the present disclosure.

Reference will now be made to the drawing figures to describe the present lamp control system in detail.

Referring to FIG. 1, a lamp control system 100 includes a first driving circuit 20 and a second driving circuit 30 which are electrically connected with a lamp 22, a utility power source 40 electrically connected with the first driving circuit 20, a vehicle power supply 50, and a chovr electric line 60 electrically connected between the vehicle power supply 50 and the second driving circuit 30. The lamp 22 is a light emitting diode (LED) lamp which includes a plurality of LEDs connected in series/parallel and is mounted in a tunnel for illumination.

The first driving circuit 20 includes an AC-to-DC converting circuit and a constant current circuit. The AC-to-DC converting circuit is electrically connected with the utility power source 40. The AC-to-DC converting circuit receives an AC power from the utility power source 40, then converts the AC power into a DC power and finally outputs the DC power to the constant current circuit. The constant current circuit receives the DC power from the AC-to-DC converting circuit and supplies a constant direct current to the lamp 22 for driving the LEDs of the lamp 22 to emit light.

Figure 2:
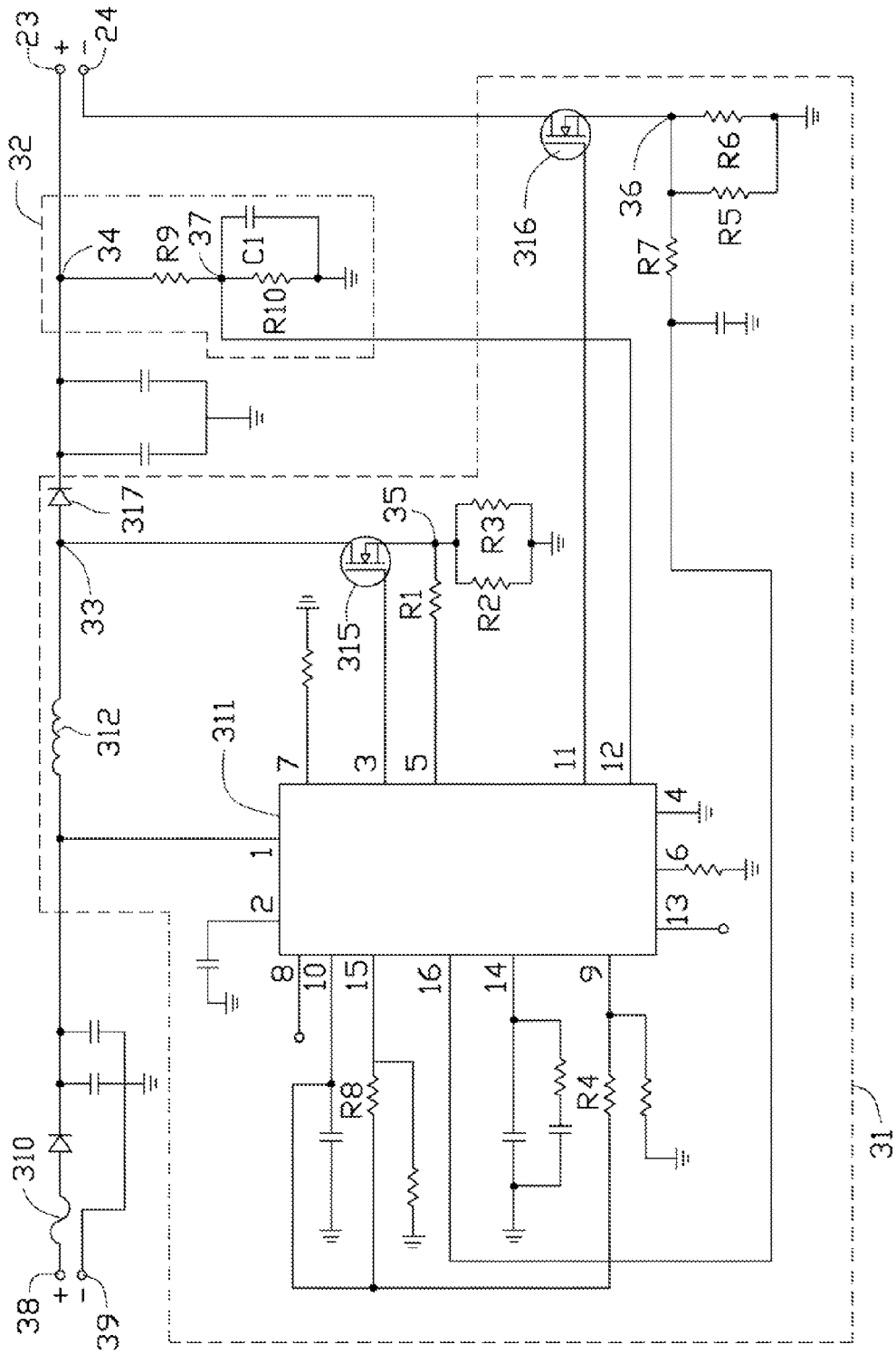
FIG. 2 shows a circuit diagram of a second driving circuit of the lamp control system of FIG. 1.

Referring to FIG. 2, the second driving circuit 30 includes a boost circuit 31 and an overvoltage protecting circuit 32. The boost circuit 31 includes a step-up controller 311, a power inductor 312, a first switch transistor 315, a second switch transistor 316, and a boost diode 317. The step-up controller 311 is electrically connected with the vehicle power supply 50. The first and second switch transistors 315, 316 are electrically connected between the step-up controller 311 and the power inductor 312 for controlling a charge/discharge of electric power of the power inductor 312. The vehicle power supply 50 is a DC power source, and has an output voltage much lower than a working voltage of the lamp 22. Alternatively, the vehicle power supply 50 can be other assistance DC power source which can output a DC electric power to the second driving circuit 30. In this embodiment, an output voltage of the vehicle power supply 50 is about 16V. The chovr electric line 60 has a first plug (not shown) at one end for electrically connecting to the vehicle power supply 50 and a second plug (not shown) at another end for electrically connecting to the second driving circuit 30. The second driving circuit 30 includes a socket (not shown) corresponding to the second plug of the chovr electric line 60. The vehicle power supply 50 includes a socket (not shown) corresponding to the first plug of the chovr electric line 60.

When used, if the utility power source 40 is interrupted, a positive terminal 38 and a negative terminal 39 of the second driving circuit 30 can be respectively connected to an anode and a cathode of the vehicle power supply 50 via the chovr electric line 60 for receiving an electric power from the vehicle power supply 50. The second driving circuit 30 promotes the output voltage of the vehicle power supply 50 and finally outputs the promoted voltage to the lamp 22 to drive the lamp 22 to lighten. A fuse 310 is electrically connected between the positive terminal 38 of the second driving circuit 30 and the step-up controller 311. The fuse 310 can protect the step-up controller 311 and the lamp 22 from being damaged by excessive electric current when an accidental short circuit occurs or the second driving circuit 30 is electrically connected to a large DC power source by mistake. The fuse 310 is made of metal which melts when an electric current flows therethrough exceeds a specific amperage, thereby cutting-off the second driving circuit 30 and the vehicle power supply 50 for protecting the step-up controller 311 and the lamp 22 from damage.

The step-up controller 311 is an encapsulated integrated circuit chip which includes sixteen electric pins 1-16. The sixteen electric pins 1-16 are in sequence a first electric pin 1 to a sixteenth electric pin 16. Such a step-up controller 311 may refer to HV9912, a model made by Supertex Inc., a US-based company. The first and second switch transistors 315, 316 are both N-channel enhancement mode MOSFETs (metal-oxide-semiconductor field effect transistors). The first electric pin 1 of the step-up controller 311 is an input end for receiving a DC electric power. An appropriate working voltage of the step-up controller 311 is between 12V~24V.

The power inductor 312 and the boost diode 317 are connected between the first electric pin 1 of the step-up controller 311 and an anode 23 of the lamp 22 in series. A first junction 33 is formed between the power inductor 312 and an anode of boost diode 317. A second junction 34 is formed between a cathode of the boost diode 317 and the anode 23 of the lamp 22. The second electric pin 2 of the step-up controller 311 is connected to the ground via a capacitor (not labeled). The third electric pin 3 of the step-up controller 311 is connected to a gate of the first switch transistor 315. The fourth electric pin 4 of the step-up controller 311 is directly connected to the ground. The fifth electric pin 5 of the step-up controller 311 is connected to a drain of the first switch transistor 315 via a current limit resistor R1, and a source of the first switch transistor 315 is connected to the first junction 33. The sixth electric pin 6 of the step-up controller 311 is connected to the ground via a resistor. A third junction 35 is formed between the current limit resistor R1 and the drain of the first switch transistor 315. A first and a second current sensing resistors R2, R3 are electrically connected between the third junction 35 and the ground. The first and the second current sensing resistors R2, R3 are connected in parallel.

The eleventh electric pin 11 of the step-up controller 311 is electrically connected to a gate of the second switch transistor 316. A source of the second switch transistor 316 is electrically connected to a cathode 24 of the lamp 22. A drain of the second switch transistor 316 is electrically connected to the ground via a third and a fourth current sensing resistors R5, R6. The third and the fourth current sensing resistors R5, R6 are connected in parallel. A fourth junction 36 is formed between the drain of the second switch transistor 316 and the fourth current sensing resistor R6. A feedback resistor R7 is connected between the fourth junction 36 and the sixteenth electric pin 16 of the step-up controller 311. The sixteenth electric pin 16 of the step-up controller 311 is used to control a magnitude of an electric current that is supplied to the lamp 22 by the second driving circuit 30. The twelfth electric pin 12 of the step-up controller 311 is an overvoltage protecting end. When a voltage applied to the twelfth electric pin 12 of the step-up controller 311 is lager than a predetermined value, the twelfth electric pin 12 of the step-up controller 311 functions to form an open circuit between the third electric pin 3 and the gate of the first switch transistor 315, and an open circuit between the eleventh electric pin 11 and the gate of the second switch transistor 316.

The thirteenth electric pin 13 of the step-up controller 311 is a PWM signal input end. The thirteen electric pin 13 of the step-up controller 311 receives a PWM signal for controlling a light intensity of the lamp 22. The ninth electric pin 9 of the step-up controller 311 is connected with the tenth electric pin 10 of the step-up controller 311 via a first loading resistor R4, and the fifteenth electric pin 15 of the step-up controller 311 is connected with the tenth electric pin 10 of the step-up controller 311 via a second loading resistor R8. The tenth electric pin 10 of the step-up controller 311 can provide a fiducial voltage. The fifteenth electric pin 15 is used for setting a range, i.e., a maximum value and a minimum value, of the electric current which is supplied to the lamp 22 by the second driving circuit 30. The range can be changed by changing a resistance of the second loading resistor R8. The ninth electric pin 9 of the step-up controller 311 is an overcurrent protection end. When an electric current applied on the first electric pin 1 of the step-up controller 311 is larger than a predetermined value, the ninth electric pin 9 of the step-up controller 311 functions to force the step-up controller 311 to stop working to thereby keep the step-up controller 311 from damage. The predetermined value of the electric current inputted into the first electric pin 1 of the step-up controller 311 can be changed by changing a resistance of the first loading resistor R4.

The fourteen electric pin of the step-up controller 311 is used for detecting a work statue of the step-up controller 311 during operation of the step-up controller 311, to make sure the step-up controller 311 always operation normally. The eighth electric pin 8 of the step-up controller 311 is a function extension end. The eighth electric pin 8 of the step-up controller 311 can be used to connect an eighth electric pin of another step-up controller for satisfying different requirements. In this second driving circuit 30, the thirteen electric pin 13, the fourteen electric pin 14 and the eighth electric pin 8 of the step-up controller 311 are not used.

When the electrical power of the utility power source 40 is supplied normally, the AC-to-DC conversion circuit converts the AC power received from the utility power source 40 into DC power, and provides the DC power to the constant current circuit. The constant current circuit then supplies the constant electric current into the lamp 22 for driving the LEDs of the lamp 22 to lighten. When the utility power source 40 is interrupted, the vehicle power supply 50 can be electrically connected to the second driving circuit 30 via the chovr electric line 60 for driving the lamp 22 to run in an emergency illumination mode according to user's needs.

The step-up controller 311 firstly receives the electric power from the vehicle power supply 50 via the first electric pin 1, then controls the first and second switch transistors 315, 316 to turn on or turn off repeatedly via the third electric pin 3 and the eleventh electric pin 11, respectively. A time period of the first switch transistor 315 turns on and turns off can be changed by changing resistances of the first and the second current sensing resistors R2, R3. Similarly, a time period of the second switch transistor 316 turns on and turns off can be changed by changing resistance of the third and the fourth current sensing resistors R5, R6. During a first period when the first and second switch transistors 315, 316 are both turned on, the power inductor 312 is charged by the vehicle power supply 50 to promote the voltage which inputted into the power inductor 312. During a second period when the first and second switch transistors 315, 316 are both turned off, electrical power with promoted voltage in the power inductor 312 is released and supplied to the lamp 22 for driving the lamp 22 to lighten. Accordingly, the lamp 22 provides emergency illumination. A magnitude the voltage which is supplied into the lamp 22 can be changed by changing the first period and the second period.

The boost diode 317 is connected between the power inductor 312 and the anode 23 of the lamp 22. The boost diode 317 is for preventing a refluence of the electric current from the lamp 22 to the vehicle power supply 50 via the second driving circuit 30. The overvoltage protecting circuit 32 includes a first shunt resistor R9 and a second shunt resistor R10 connected in series between the second junction 34 and the ground and a capacitor C1 connected in parallel with the second shunt resistor R10. One end of the first shunt resistor R9 is electrically connected with the second junction 34, and another end of the first shunt resistor R9 is electrically connected with the second shunt resistor R10 to form a fifth junction 37 therebetween. The twelfth electric pin 12 of the step-up controller 311 is connected with the fifth junction 37. Thus, the voltage at the twelfth electric pin 12 of the step-up controller 311 equals to a voltage at the second shunt resistor R10 of the overvoltage protecting circuit 32. When the voltage supplied into the lamp 22 is larger than the working voltage of the lamp 22, the voltage drop at the second shunt resistor R10 is larger than the predetermined value of the voltage which can be applied on the twelfth electric pin 12 of the step-up controller 311. Thus, open circuits are respectively formed between the third and eleventh pins 3, 11 of the step-up controller 311 and the gates of the first and second switch transistors 315, 316 to force the step-up controller 311 to stop working. Therefore, the overvoltage protecting circuit 32 can protect the step-up controller 311 and the lamp 22 from overvoltage damage.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lamp control system comprising:
a first driving circuit adapted for electrically connecting a lamp with a utility power source to convert an AC power of the utility power source to a DC power and supply the DC power to the lamp;
an assistance DC power source having an output voltage lower than a working voltage of the lamp; and
a second driving circuit adapted for electrically connecting the assistance DC power source with the lamp, the second driving circuit comprising a boost circuit, the boost circuit being connected to the assistance DC power source to promote the output voltage of the assistance DC power source to the working voltage of the lamp and then supply the promoted voltage to the lamp to lighten the lamp when the utility power source is off;
wherein the boost circuit comprises a step-up controller, a power inductor, a first transistor and a second transistor, the assistance DC power source being electrically connected with the step-up controller, the first transistor and the second transistor being turned on and turned off repeatedly under a control of the step-up controller, during a period when the first and second transistors are both turned on, the power inductor being charged, during a period when the first and second transistors are both turned off, electrical power in the power inductor being released and supplied to the lamp; and
wherein a feedback resistor is connected between one electric pin of the step-up controller and the second transistor to control a magnitude of an electric current that is supplied to the lamp by the second driving circuit.

2. The lamp control system of claim 1, wherein the assistance DC power source is a vehicle power supply.

3. The lamp control system of claim 1, wherein the first transistor is a N-channel enhancement mode MOSFET, a gate of the first transistor being electrically connected with one electric pin of the step-up controller, a drain of the first transistor being electrically connected with another electric pin of the step-up controller via a current limit resistor, a source of the first transistor being electrically connected with a first end of the power inductor with a junction formed therebetween, a second end of the power inductor being electrically connected with the assistance DC power source, the junction being electrically connected to an anode of the lamp via a boost diode.

4. The lamp control system of claim 3, wherein two current sensing resistors are electrically connected between the drain of the first transistor and the ground, the two current sensing resistors being connected in parallel.

5. The lamp control system of claim 1, wherein the second transistor is a N-channel enhancement mode MOSFET, a gate of the second transistor being electrically connected with one electric pin of the step-up controller, a drain of the second transistor being electrically connected with another electric pin of the step-up controller via a resistor, a source of the second transistor being electrically connected with a cathode of the lamp.

6. The lamp control system of claim 5, wherein two current sensing resistors are electrically connected between the drain of the second transistor and the ground, the two current sensing resistors being connected in parallel.

7. The lamp control system of claim 1, wherein the second driving circuit comprises an overvoltage protecting circuit, the overvoltage protecting circuit comprising a first resistor and a second resistor connected in series between the anode of the lamp and ground and a capacitor, a junction being formed between the first and the second resistors, the capacitor being electrically connected between the junction and the ground, the junction being electrically connected with an electric pin of the step-up controller, when a voltage applied on the electric pin of the step-up controller larger than a predetermined value, the first transistor and the second transistor being both turned off under the control of the step-up controller.

8. The lamp control system of claim 1, wherein a fuse is connected between the boost circuit and the assistance DC power source.

9. The lamp control system of claim 1, wherein the lamp is a light emitting diode lamp and mounted in tunnel.

* * * * *